Patented Sept. 16, 1930

1,776,055

UNITED STATES PATENT OFFICE

HARRY M. WEBER, OF BOSTON, MASSACHUSETTS, ASSIGNOR TO ELLIS-FOSTER COMPANY, OF MONTCLAIR, NEW JERSEY, A CORPORATION OF NEW JERSEY

ANIMAL FOOD

No Drawing.    Application filed July 10, 1928. Serial No. 291,692.

This invention relates to the preparation of a biscuit suitable for use as a food for dogs and other animals and particularly to a specially shaped biscuit containing vitamines. Previously biscuits prepared for this purpose have been made of materials containing a balanced composition adapted to serve as a complete food for dogs from the standpoint of having sufficient proteid carbohydrate but no consideration has been given to the vital factors of foods, namely the so-called vitamines in the preparation of the biscuit nor has there been any means taken to preserve the vitamines that may have been present in the biscuit upon storage. Feeding dogs with these vitamine-deficient biscuits without any supplementary foods has led to a diseased condition and in some cases death of the animal due to scurvy, rickets and the like attributable to the original lack of or subsequent destruction of the accessory food factors.

In the present invention it is the object to prepare a biscuit which in itself is as nearly as possible a complete food for dogs without the necessity of supplementary feeding to furnish the necessary health preserving and growth-promoting constituent. Furthermore by means of the present invention a biscuit is obtained having a coating which is impervious or nearly impervious to the air thereby retarding the oxidation of the so-called vitamines present and in addition fissuring of the biscuit is reduced or in most cases eliminated. The fissuring is detrimental not only from the standpoint of mechanical perfection of the biscuit but also due to fissuring oxidation of the vitamine content of the biscuit is more rapid and complete upon storage.

I have found that a biscuit can be prepared from ingredients which by proper baking treatment will yield a foodstuff for dogs which minimizes the necessity of the use of supplementary feedings. The desired vitamines may be obtained from any suitable source but among other considerations cost of the raw materials must be taken. Rice polishings or rice bran serve as the source of the anti-neuritic vitamine present in the biscuit while wheat flour which has not been bleached or treated chemically to whiten it contains vitamine B or the growth-promoting food accessory. Other suitable sources of vitamine A and B are vegetables which may or may not have been desiccated. If desiccated however desiccation must have been carried out under conditions such as not to have injured or destroyed the vitamine content. Protection against scurvy is aided by the use of milk in the preparation of the biscuit but in this respect supplementary feeding of foods rich in vitamine C or the antiscorbutic vitamine is desirable.

I have also found that by curving the biscuit slightly it enables a dog, particularly younger dogs, to handle the biscuit more readily. The curving of the biscuit may be accomplished by baking the biscuit on a curved surface and this is readily accomplished in the present day continuous baking ovens in use. In the examples given below the parts are by weight. As an example of the present invention the following is given:

100 parts of wheat flour (middling grade), 100 parts of rice bran, 1¼ parts of malt syrup, 20 parts of glucose, 1¼ parts of salt, 100 parts of water, 40 parts of milk. The above materials were mixed to form a stiff dough, shaped by cutting and baked on a curved surface at 450° F. for 15 minutes. The biscuit prepared in this manner became hard on standing, had a good surface and showed no signs of fissuring.

A superior form of composition in that it contains a greater quantity of the growth-promoting vitamines is as follows:

100 parts of rice polishings, 100 parts of rice bran, 1¼ parts of malt syrup, 1¼ parts of salt, 20 parts of glucose, 40 parts of milk, 100 parts water. The above material was mixed to form a stiff dough or paste and baked at 450° F. for 15 minutes. The biscuits obtained were somewhat more moist than in the preceding formula and required a somewhat longer time to become dry and hard but the biscuit obtained shows no signs of fissuring and had a good surface.

An example of a somewhat shorter biscuit and one which is richer in vitamines is the following:

100 parts of wheat flour (middling grade), 100 parts of rice bran, 10 parts of cod liver oil, 1¼ parts of salt, 1¼ parts of malt extract, 20 parts glucose, 40 parts milk, 100 parts of water. The cod liver oil, milk and water were first mixed and the oil emulsified by rapid beating. The solution was then added to a mixture of the dry ingredients, mixed to form a stiff dough or paste and baked on a curved surface. The biscuit obtained had a better texture than either of the above formulas in that it was less moist and somewhat shorter. It dried more rapidly and had a somewhat more impervious coating or surface. The odor or flavor of the cod liver oil added did not detract from the palatability of the biscuit and in fact when the three biscuits were offered to a dog he selected that containing the cod liver oil as being the most desirable.

As mentioned above the curving of the biscuit, so as to make a tipping-up biscuit so that a dog, particularly a young dog, is enabled to handle the biscuit a great deal more readily, can be accomplished in several ways. One way of accomplishing this in the present-day continuous baking ovens is to have the pans on which the biscuits are baked made up in a series of curved surfaces, the curves being proportional to the length of the biscuit so that the wet dough on being placed upon the pan naturally assumes the shape of the curved surface and is then baked hard when lying in this position. The curve may of course be of any degree but the most desirable curve would be of such a degree as to make the center of the biscuit between one-fourth and one-half of an inch above the plane of the ends of the biscuit. Another way in which a tipping biscuit can be made is by pre-forming the dough so as to have the ends of the biscuit shaped to form an angle so that by a dog merely treading on the end of the biscuit the opposite end would be raised in the air enabling the biscuit to be eaten by the dog. The shaped ends could readily be formed in a suitable mold and baked as in the foregoing.

A biscuit in bar form is desirable as the tipping or tilting effect is readily obtained by producing the bar in bent or slightly curved shape so that it does not rest firmly on the floor. Moreover the bar shape lends to compactness in packaging. A bar 6 to 8 inches long, 1½ to 2 inches in width and about ¾ths of an inch in thickness is an appropriate size for full grown dogs. The thickness may be increased or decreased as desired. In general I prefer the length of the biscuit to be substantially greater than the width. A so-called puppy biscuit may be made about 3 inches in length and 1 inch in width having a thickness of perhaps ½ inch.

As stated the bar form may be produced easily in a form which affords a tilting or tipping effect. It may be curved uniformly throughout its length or may be made with irregular curves. The curvature is preferably along the flat side. Another method and one which is very practical to make is that of a bar bent slightly at the middle but with straight members rather than curving ones. When the apex of this bar is resting on the floor the bar may be readily tilted.

The tilting biscuit is especially desirable when non-fissured as the absence of fissures makes "tooth-hold" difficult and this is compensated for by the tilting effect.

I do not however limit myself herein to a non-fissured biscuit but prefer the latter when the composition contains added vitamines, that is when a biscuit enriched in vitamines is to be prepared. A composition which does not fissure on baking but affords a glazed hard crust over the entire surface is beneficial in preserving the vitamine content as noted above.

The bar-shaped biscuit in some cases may be made somewhat in the form of a femur bone as set forth in Ellis Patent No. 982,711, with however the improvement of having the side of the biscuit curved or bent at the middle in the manner indicated above to secure an effective tilting action. Thus the rectilinear bar indicated above may have its ends enlarged or knobbed to somewhat resemble a femur while at the same time having a curvature resembling a rib bone or an angular bend at the middle or near either end to accomplish the same result.

A product somewhat approximating the shape of a rib bone and having the tilting qualities of a rib bone forms a part of the present invention. I do not however necessarily follow the proportions of rib bones as a somewhat thicker or heavier product is less fragile and therefore less likely to break on shipment.

A further feature of my invention is that of drying or curing the baked biscuits. The larger sizes after baking contain a considerable amount of moisture. In this condition if immediately packaged moulding is likely to result. This is especially true in the case of a vitamine-enriched product within the scope of the present invention. I therefore preferably subject the baked biscuit to air-drying or aging until the moisture has evaporated to an extent sufficient to overcome danger from moulding. This may take several days or several weeks depending upon the curing conditions. In dry weather, for example during the winter season when the humidity is low ordinary air-drying may serve the purpose while under humid conditions a room artificially heated and well ventilated may be used to advantage. During the drying operation it is desirable not to heat the biscuit too strongly but simply to subject them to a gentle heat, say between 30 and 50° C. for a sufficient period to cause gradual water elimination to a point below which moulding or decomposition of vegetable material does not readily occur.

The examples of compositions given above for making such biscuits or animal food, do not include meat products, but if desired dried comminuted meat such for example as dried powdered liver may be added. Furthermore it should be noted that the illustrations given may be widely varied as for example by reducing the content of glucose that is present or omitting the latter entirely. Other changes in the proportions of the ingredients may be made as is well known to those skilled in the art.

The biscuits preferably are packed in containers lined with waxed paper.

Reference is made to the applicant's companion case, Serial Number 702,134, filed March 26, 1924, of which the present application is a continuation in part.

Having thus set forth my invention, I claim:

1. A substantially bar-shaped dog biscuit of generally concavo-convex shape in longitudinal cross-section, capable when resting on its concave face, of being easily grasped intermediate its ends, and when resting on its convex face, of being easily grasped at either end, whereby said biscuit is capable of being handled readily by an animal at any time during consumption.

2. A rockable, substantially bar-shaped dog biscuit of generally concavo-convex shape in longitudinal cross-section, and having flattened faces and knobbed ends, whereby said biscuit is capable of being handled readily by an animal at any time during consumption.

HARRY M. WEBER.